United States Patent
Sbongk (10) Patent No.: US 10,369,920 B2
(45) Date of Patent: Aug. 6, 2019

(54) COMBINATION OF A SECURING EYE AND A HOLDING PLATE

(71) Applicant: ILLINOIS TOOL WORKS INC., Glenview, IL (US)

(72) Inventor: Albert Sbongk, Niederstetten (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 15/502,040

(22) PCT Filed: Jun. 22, 2015

(86) PCT No.: PCT/US2015/036954
§ 371 (c)(1),
(2) Date: Feb. 6, 2017

(87) PCT Pub. No.: WO2016/025079
PCT Pub. Date: Feb. 18, 2016

(65) Prior Publication Data
US 2017/0225605 A1    Aug. 10, 2017

(30) Foreign Application Priority Data
Aug. 13, 2014   (DE) .................. 10 2014 111 578

(51) Int. Cl.
*B60P 7/08* (2006.01)
*B60P 3/075* (2006.01)

(52) U.S. Cl.
CPC ............. *B60P 7/0807* (2013.01); *B60P 3/075* (2013.01); *B60P 7/08* (2013.01)

(58) Field of Classification Search
CPC ............ B60P 7/0807; B60P 7/08; B60P 3/075

USPC .... 410/101, 102, 106, 110, 116; 24/265 CD, 24/115 K
See application file for complete search history.

(56) References Cited

U.S. PATENT DOCUMENTS 4,907,921 A * 3/1990 Akright ............... B61D 45/001 410/111
5,774,948 A * 7/1998 Petschke .............. B60P 7/0807 410/101

(Continued)

FOREIGN PATENT DOCUMENTS

| EP | 1254809 A2 | 11/2002 |
| FR | 2796346 A1 | 1/2001 |
| WO | 2009156407 A1 | 12/2009 |

OTHER PUBLICATIONS

ISR & WO for PCT/US2015/036954 mailed Sep. 11, 2015.

*Primary Examiner* — Stephen T Gordon
(74) *Attorney, Agent, or Firm* — Pilloff & Passino LLP; Martin J. Cosenza (57) ABSTRACT

In a combination of a securing eye, which has a fastening portion and an eye portion, and a holding plate, the fastening portion includes a first fastening part, which incorporates the eye portion, and a second fastening part. The first fastening part has a fastening element which can be brought into a positive connecting effect with the holding plate by a rotational and/or translational mounting movement of the first fastening part. The second fastening part can be fastened to the holding plate and, in the fastened state, prevents the positive connection between the first fastening part and the holding plate from being released.

20 Claims, 4 Drawing Sheets

(56) References Cited

U.S. PATENT DOCUMENTS

| | | | |
|---|---|---|---|
| 6,065,917 A * | 5/2000 | Shambeau | B60P 7/0807 |
| | | | 410/106 |
| 2010/0193657 A1* | 8/2010 | Laney | B60P 7/0807 |
| | | | 410/106 |
| 2011/0170978 A1 | 7/2011 | Mamie | |

* cited by examiner

COMBINATION OF A SECURING EYE AND A HOLDING PLATE

RELATED APPLICATIONS

The present application is a National Phase of International Application Number PCT/US2015/036954 filed Jun. 22, 2015, and claims priority to German Application Number 10 2014 111 578.3 filed Aug. 13, 2014.

BACKGROUND

The invention relates to a combination of a securing eye and a holding plate.

Such combinations are used for example in luggage or load compartments of motor vehicles (passenger motor vehicles and heavy goods vehicles), wherein the individual securing eyes, which are generally fastened to panels of the body structure (holding plates), can be utilized as lashing points for example for lashing straps by means of which luggage or cargo can be secured in the luggage or load compartments of the motor vehicles.

At present, such securing eyes are generally screwed to the associated holding plates. This involves in particular a not insignificant level of outlay for the mounting process. Also, such a screw connection of the securing eyes generally necessitates that a threaded nut be welded to the rear side of the panel, which involves considerable outlay.

The invention is based on the object of specifying a fastening eye provided in particular for use in a luggage or load compartment of a motor vehicle, which fastening eye can be mounted in as simple a manner as possible by fastening to the associated holding plate.

Said object is achieved by means of a combination of a securing eye and a holding plate as claimed in patent claim 1. Advantageous refinements thereof are claimed in the further patent claims and will emerge from the following description of the invention.

The invention is based on the concept of connecting a securing eye to the associated holding plate exclusively by way of one or more plug-in connections, which permits simple and in particular also rapid mounting without the use of tools. For a plug-in connection of said type, it is furthermore not necessary for a fastening element, such as in particular a threaded nut, to be integrated into the holding plate. Rather, simple openings in the holding plate may suffice as connecting elements for said plug-in connection.

It must however be taken into consideration that a securing eye of said type may be and is intended to be subjected to high forces, and that an undesired release of the connection between the securing eye and the holding plate, be it under load or in the absence of external load, must be prevented. The possibility of relatively easy release of said connection would however be advantageous, for example for the purposes of exchanging the securing eye during the course of maintenance or repair work. It sought to meet these requirements in a simple manner with regard to construction and mounting in that the securing eye has at least two parts which can be separately secured to the holding plate by way of plug-in connections, wherein one of the parts serves primarily for supporting the forces, acting on the securing eye, on the holding plate, whereas the other part is intended primarily to prevent a release of the plug-in connection that connects the first part to the holding plate.

Accordingly, as claimed in the invention, a generic combination of a securing eye and a single-layer or multi-layer holding plate, wherein the securing eye has a fastening portion and an eye portion, is characterized in that the fastening portion comprises a first fastening part, which incorporates the eye portion, and a second fastening part, wherein the first fastening part has a fastening element which can be brought into a positive connecting effect with the holding plate by means of a rotational and/or translational mounting movement of the first fastening part, and wherein the second fastening part can be fastened to the holding plate and, in the fastened state, prevents the positive connection between the first fastening part and the holding plate from being released.

It may preferably be provided here that the fastening element comprises at least one fastening hook which, in order to form the positive connection, engages behind an opening in the holding plate. Accordingly, the fastening hook may have a first portion, which extends through the opening, and an end portion, which is oriented at an angle with respect to the first portion and which thus, in the connected state of the first fastening part, extends along that side of the holding plate which faces away from the main part, which comprises the eye portion, of the securing eye. A positive connection can be produced easily by means of a fastening hook of said type, for example by virtue of the end portion of the fastening hook being inserted into the opening of the holding plate while the first fastening part is in an oblique orientation, and then being moved behind the corresponding portion of the holding plate by way of a rotational movement of the first fastening part. It may also be provided that the end portion of the fastening hook is moved behind the corresponding portion of the holding plate by way of a translational movement along the holding plate. A further advantage of a fastening hook to be mounted in this way lies in the possibility of designing said fastening hook to be highly stable, because, for the mounting process, no deformation of the fastening hook is necessary, by contrast to the situation in the case of a latching connection, for example. Thus, the realization of a positive connection by means of a fastening hook of said type is advantageous in particular for the first fastening part which incorporates the eye portion and which preferably serves primarily for supporting the load, acting on the eye portion, on the holding plate.

In a preferred refinement of the combination as claimed in the invention, it may be provided that the second fastening part has at least one fastening hook which, with the second fastening part in the fastened state, engages behind an opening in the holding plate in order to produce a connection of the second fastening part to the holding plate.

Here, the fastening hook of the second fastening part may in particular also be formed as that element which, by acting as a stop, prevents a release of the positive connection of the first fastening part to the holding plate. In particular, it may also be provided that the first fastening part supports a load, acting on the ring portion, on the fastening hook of the second fastening part. For this purpose, it may particularly preferably be provided that the first fastening part forms at least one second fastening hook which, with the second fastening part in the fastened state, engages behind the fastening hook of said second fastening part and is thus supported thereon.

It may thus be provided that loads exerted on the securing eye via the eye portion are also supported on the holding plate by the second fastening part. It should however then preferably be provided that such loads are supported primarily by the first fastening part and only to a reduced extent by the second fastening part. This may advantageously be achieved by virtue of the shortest distance between the eye portion and the first fastening hook of the first fastening element being smaller than the shortest distance between the eye portion and the fastening hook of the second fastening part.

By means of such an embodiment of the securing eye of the combination as claimed in the invention, wherein loads on the eye portion are supported on the holding plate primarily by the first fastening part, it can advantageously be made possible that only the first fastening part and/or the ring portion is formed from metal (in particular steel), whereas the second fastening part, which is not subjected to load or is subjected only to low load, may be formed from plastic. Such formation of the second fastening part from plastic permits inexpensive production, for example by injection molding, while at the same time realizing a large degree of freedom with regard to the shaping of the second fastening part. In this way, said fastening part may advantageously simultaneously be designed as a cover for the first fastening part, which may have both visual and functional advantages.

It is provided that the second fastening part is (directly or indirectly) fastened to the holding plate by way of a complete fastening, that is to say a fastening which acts in all directions. In particular in the case of a design of the second fastening part wherein the latter has a fastening hook on which, preferably, a second fastening hook of the first fastening part is supported, a complete fastening of said type can be realized by virtue of the second fastening part also additionally having a latching element in order to form a latching connection with the holding plate. A mounting process of the second fastening part, by way of which the positive connection of the first fastening part to the holding plate is also simultaneously secured, can then be achieved by virtue of the fastening hook of the second fastening part being moved, by way of a rotational and/or translational insertion movement of the second fastening part, into a position in which said fastening hook engages behind the corresponding opening in the holding plate, while at the end of said insertion movement, the latching element latches into a corresponding recess or opening of the holding plate.

An advantageous distribution of the forces which, when load is exerted on the eye portion of the securing eye, are transmitted by the individual elements which realize a connection between the securing eye and the holding plate can be achieved in that the fastening element of the first fastening part and/or the portion, incorporating the eye portion, of the first fastening part is arranged between the fastening hook and the latching element of the second fastening part in the fastened state of the second fastening part. By means of such an embodiment of the securing eye, it is possible, in particular in combination with the furthermore preferred embodiment in which the point at which the eye portion is incorporated is arranged closer to the fastening element of the first fastening part than to the fastening hook of the second fastening part, to achieve that the greatest forces are supported by the fastening element, which is preferably in the form of a fastening hook, of the first fastening part. Then, the fastening hook of the second fastening part, which is preferably formed from plastic, only has to support considerably lower forces, and the latching element of the second fastening part only has to support even further reduced forces.

It may basically be provided that the fastening element of the first fastening part and the fastening hook and the latching element of the second fastening part engage into one and the same opening of the holding plate. This may however have the effect that said opening must be relatively large, which may adversely affect the stability of the connection of the securing eye to the holding plate. It may therefore advantageously be provided that the holding plate has at least two openings for receiving the first fastening element of the first fastening part and/or the fastening hook of the second fastening part and/or the fastening element of the second fastening part. In particular, in each case one opening may be provided in the holding plate for receiving the fastening element of the first fastening part, the fastening hook of the second fastening part and the latching element of the second fastening part.

To further simplify the mounting of the securing eye of the combination as claimed in the invention, it may preferably be provided that the first fastening part and the second fastening part are connected to one another in a movable manner. For this purpose, it may be provided in particular that the second fastening part has a prong which is guided in an (in particular slot-shaped) opening of the first fastening part, wherein the prong (in particular at a free prong end) has a projection serving as a stop. Owing to the movable connection between the first fastening part and the second fastening part, the securing eye can be formed in the manner of a unit, thus making it possible for the mounting process to be performed easily and in particular also using one hand.

It may preferably be provided for the securing eye that the eye portion is pivotable relative to the fastening portion. It is thus possible to prevent a bending load being exerted on the eye portion as a result of a load direction oriented obliquely with respect to the holding plate. Furthermore, it is made possible in this way for the eye portion to be pivoted against the fastening portion and/or or the holding plate in particular when the securing eye is not in use, for example in order to prevent said fastening portion from protruding into a luggage compartment of a motor vehicle.

A pivotable design of the eye portion may be realized in a structurally simple manner by virtue of the eye portion comprising a ring component which is held in a rotationally movable manner in a receptacle of the first fastening part and/or between the first fastening part and the holding plate. Such an embodiment of the securing eye furthermore makes it possible for the first fastening part and/or the ring component to be formed as a bent part, which is easy to produce.

Here, it may preferably be provided that the ring component is held positively in the receptacle. For this purpose, a latching projection may be provided which is temporarily elastically deformed when inserting the ring component into the receptacle and, after returning to its initial state, effects the corresponding fixing of the ring component in the receptacle.

The securing eye may be provided in particular for use in a luggage compartment or load compartment of a motor vehicle. The holding plate may then in particular be a wall or floor surface in the luggage or load compartment. The wall or floor surface may in this case also be a body part of the motor vehicle, composed for example of fiber-reinforced plastic (for example CFRP) or of sheet metal.

The indefinite article ("a", "an"), in particular in the patent claims and in the above description generally explaining the patent claims, should be understood as such and not as numerals. Components accordingly specified thereby should thus be understood as being present at least once, it being possible for them to be present multiple times.

BRIEF DESCRIPTION OF THE DRAWINGS

The invention will be discussed in more detail below on the basis of exemplary embodiments illustrated in the drawings, in which.

DETAILED DESCRIPTION OF THE DRAWINGS

The embodiment of a combination as claimed in the invention illustrated in FIGS. 1 to 6 comprises a securing eye and a holding plate 1. For the mounting of the securing eye, the latter is fastened to the holding plate 1.

The securing eye comprises an eye portion which is in the form of a ring component 2 composed of metal. The ring component 2 can be produced in a simple manner from a bar-shaped semifinished part by bending.

The securing eye furthermore comprises a two-part fastening portion. A first fastening part 3 of the fastening portion is in the form of a deformed sheet-metal component. Said first fastening part 3 comprises a main body with a planar portion 4, the underside of which is provided for abutment against the holding plate 1, and a tunnel-shaped portion 5, which forms a receptacle in which a portion, which is of straight form, of the ring component 2 is mounted in rotationally movable fashion. The longitudinal axis of the receptacle runs perpendicular to a longitudinal direction of the first fastening part 3.

On that side of the tunnel-shaped portion 5 which is remote from the planar portion 4, the main body transitions into two fastening elements which run parallel to one another and which extend in the longitudinal direction of the first fastening part 3 and which are in the form of (first) fastening hooks 6. In a first portion, said first fastening hooks 6 run approximately perpendicular to the planar portion 4 of the main body, and said fastening hooks are then bent through approximately 90°, whereby end portions of the first fastening hooks 6 run approximately parallel to the planar portion 4 of the main body. In this case, the distance between the end portions and the planar portion 4 of the main body corresponds approximately to the wall thickness of the holding plate 1 in the portion provided for receiving the securing eye.

On that side of the planar portion 4 which is remote from the tunnel-shaped portion 5 of the main body, the main body transitions into a (second) fastening hook 7 which extends in the longitudinal direction of the first fastening part 3. Said second fastening hook 7 also runs, in a first portion, approximately perpendicular to the planar portion 4 of the main body and, in an end portion, approximately parallel to said planar portion. In this case, the distance between the planar portion 4 of the main body and the end portion of the second fastening hook 7 is greater than the wall thickness of the holding plate 1.

Figure 12:
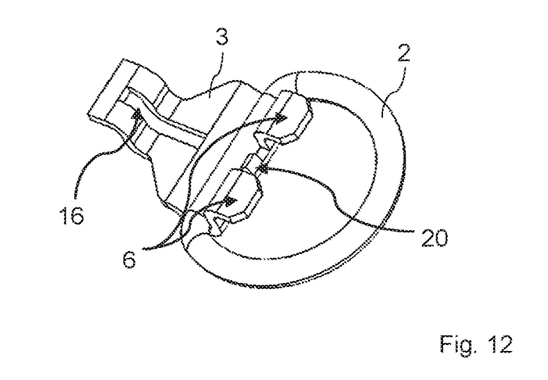
FIG. 12 shows a first fastening part and a ring component of the securing eye as per FIGS. 7 to 11 in a perspective view.

During the mounting of the securing eye, it is firstly the case that the ring component 2, which serves as eye portion, is inserted into the receptacle of the first fastening part 3. Here, a latching projection 20 is temporarily elastically deflected, which latching projection, after springing back, holds the ring component 2 positively but rotatably in the receptacle of the first fastening part 3 (cf. FIG. 12). The insertion of the ring component 2 into the receptacle may be provided as a mounting step carried out beforehand, such that the first fastening part 3 and the ring component 2 may be delivered as a preassembled unit, whereby the final mounting process, that is to say the connection between the securing eye and the holding plate, can be further simplified.

Subsequently, the end portions of the two first fastening hooks 6 are inserted into two (first) openings 8, which are complementary to the cross sections of said first fastening hooks 6, of the holding plate 1. Here, the first fastening part 3 is, in terms of its longitudinal direction, oriented approximately perpendicular in relation to the holding plate 1 (cf. FIG. 1).

Figure 1:
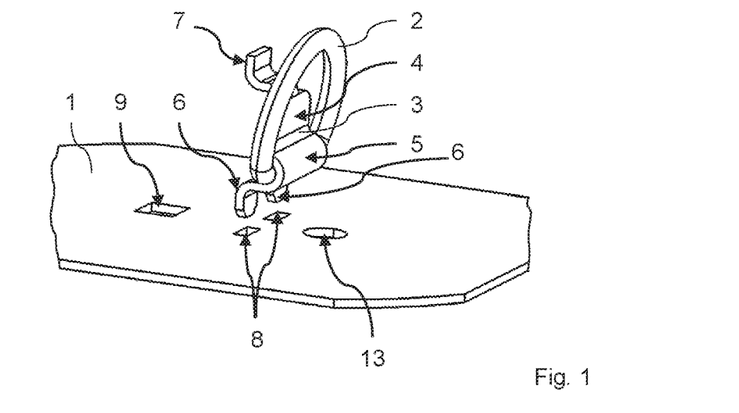
FIGS. 1 to 5 show different steps during the mounting of a securing eye of a combination as claimed in the invention composed of a securing eye and a holding plate, in a first embodiment.
Figure 2:
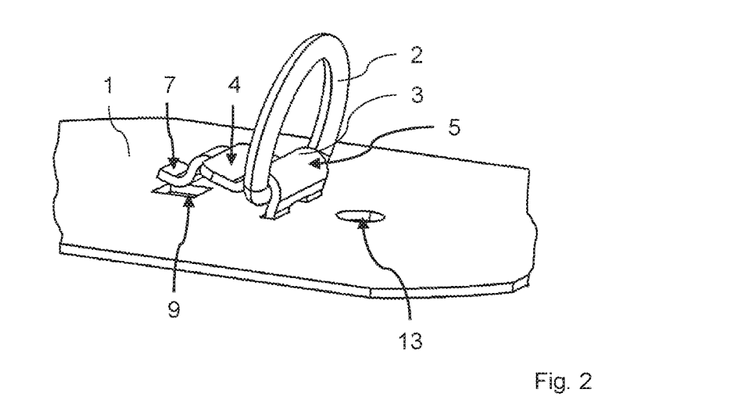

By means of a pivoting movement of the first fastening part 3, wherein the two first fastening hooks 6 guided in the first openings 8 of the holding plate 1 serve as pivot joints, the underside of the planar portion 4 of the main body of the first fastening part 3 is placed in contact with the top side of the holding plate 1 (cf. FIG. 2). In the process, the second fastening hook 7 of the first fastening part 3 protrudes into a second opening 9 of the holding plate 1. The pivoting of the first fastening part 3 furthermore causes the first portions of the first fastening hooks 6 to be positioned within the first openings 8, whereas the end portions of said first fastening hooks are oriented parallel to the underside of the holding plate 1, whereby said end portions engage behind the first openings 8. In this way, a positive connection between the first fastening part 3 and the holding plate 1 is formed, which can be released again only by way of a pivoting movement of the first fastening part 3 in a direction opposed to the pivoting during the mounting process.

Since the open side of the tunnel-shaped portion 5 of the main body of the first fastening part 3 is closed owing to the abutment of the first fastening part 3 against the top side of the holding plate 1, a release of the ring component 2 from the receptacle of the first fastening part 3 is prevented.

To secure the fixing of the first fastening part 3 and thus of the securing eye as a whole to the holding plate 1, a second fastening part 10 is provided, which is formed from plastic. Said second fastening part 10 also comprises a main body, which is of partially hollow form and which can thereby surround that portion of the first fastening part 3 which bears against the top side of the holding plate 1. With regard to a longitudinal direction of the second fastening part 10, said second fastening part forms, at one end, a (third) fastening hook 11, and, at the opposite end, a latching element 12.

Figure 3:
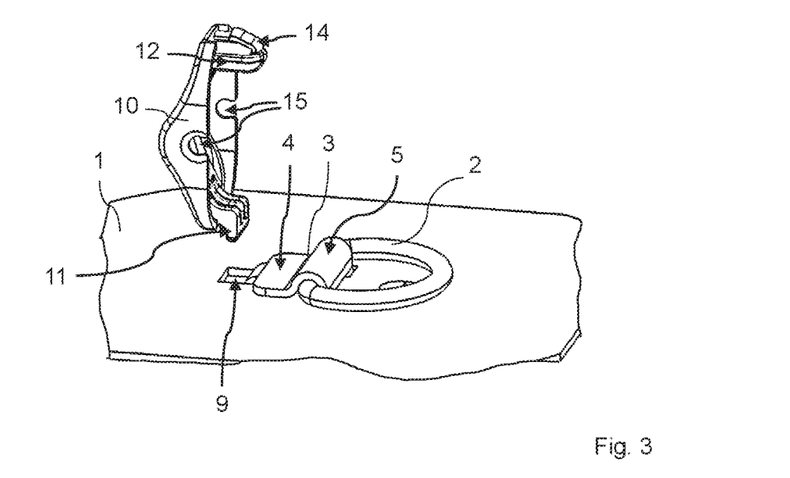
Figure 4:
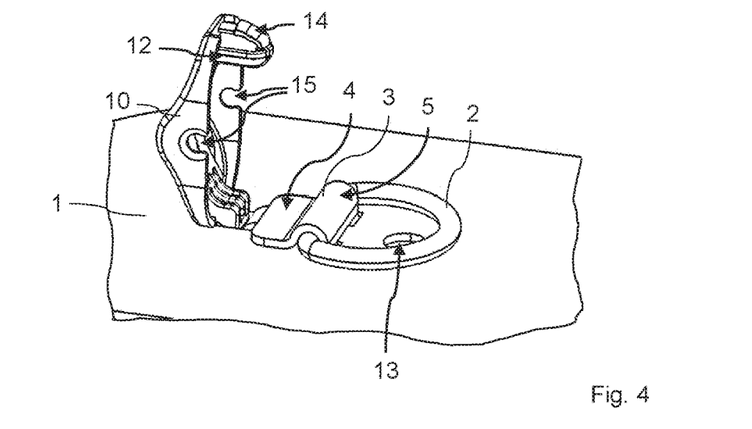

By means of the third fastening hook 11 and the latching element 12, the second fastening part 10 can be fastened completely to the holding plate 1. For this purpose, as illustrated in FIG. 3, the second fastening part 10 is, with regard to its longitudinal direction, placed in a position oriented approximately perpendicular to the holding plate 1, and then an end portion of the third fastening hook 11 is inserted into the second opening 9 of the holding plate 1 (cf. FIG. 4).

Figure 5:
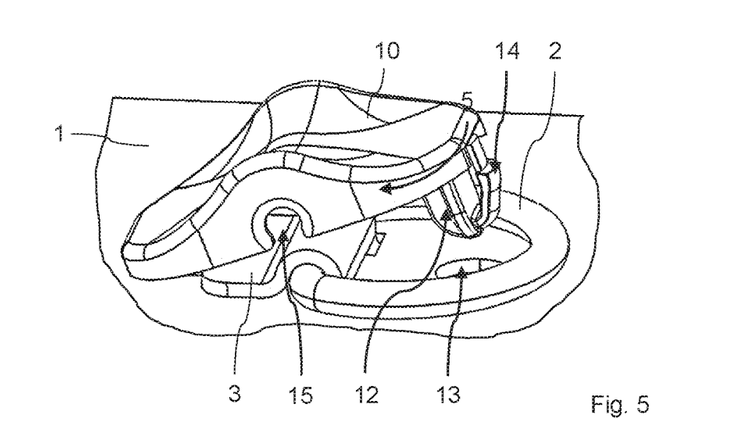
Figure 6:
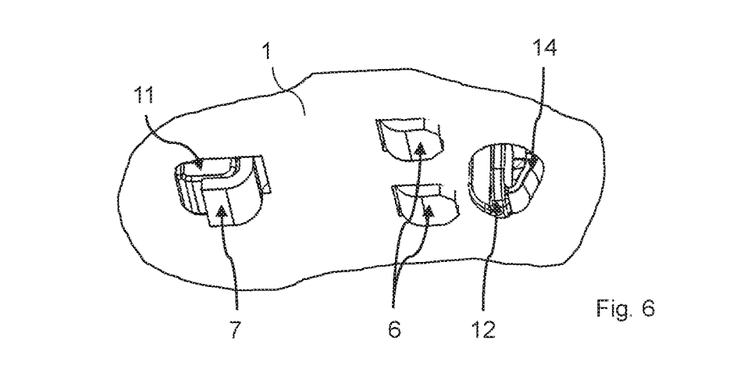
FIG. 6 shows a view from below of the combination as per FIGS. 1 to 5 with the securing eye mounted.
Figure 7:
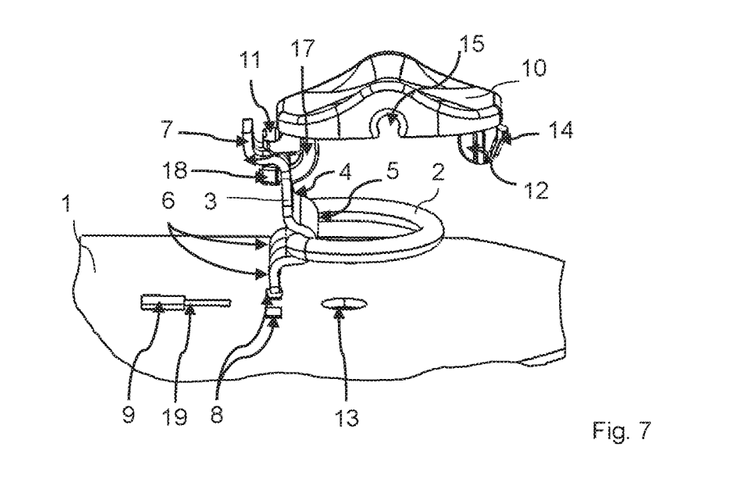
FIGS. 7 to 10 show different steps during the mounting of a securing eye of a combination as claimed in the invention composed of a securing eye and a holding plate, in a second embodiment.
Figure 8:
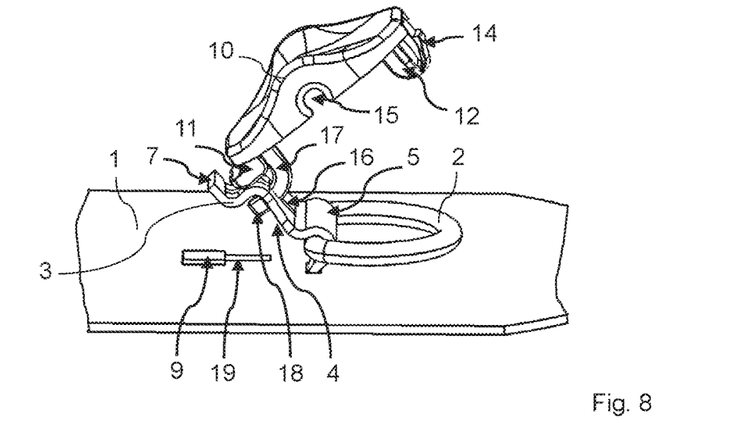
Figure 9:
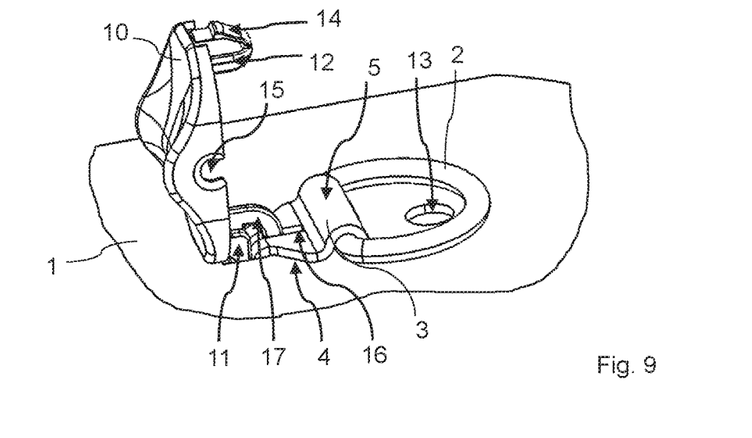
Figure 10:
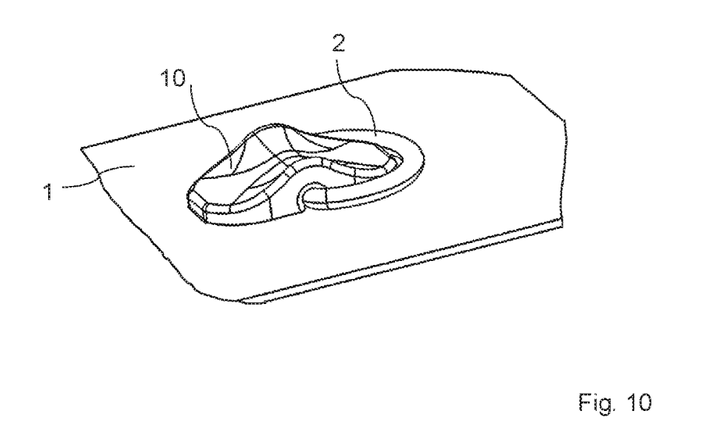

Subsequently, the second fastening part 10 is also pivoted, wherein said movement is guided by the third fastening hook as a pivot joint (cf. FIG. 5). Said pivoting movement, the direction of which is opposed to the direction of the pivoting of the first fastening part 3 (during the mounting process), takes place as far as an end position, in which the underside of the second fastening part 10 bears against the top side of the holding plate 1 and the latching element 12 protrudes into a corresponding third opening 13 of the holding plate 1. This protrusion of the latching element 12 causes a latching portion 14 of the latching element 12 to be temporarily deformed, which latching element thus, in the end position, engages behind the third opening 13 of the holding plate 1 and consequently forms a latching connection between the second fastening part 10 and the holding plate 1 (cf. FIG. 6). The pivoting of the second fastening part causes the third fastening hook 11 to rotate into a position in which the end portion thereof is arranged, in approximately parallel orientation, between the holding plate 1 and the end portion of the second fastening hook 7 of the first fastening part 3 (cf. FIG. 6). In this way, it is no longer possible for the first fastening part 3 to be pivoted in the direction opposed to the pivoting during the mounting process, whereby the securing eye as a whole is completely fixed to the holding plate 1.

In the end position of the second fastening part 10, that portion of the first fastening part 3 which protrudes from the top side of the holding plate 1 is completely surrounded by the second fastening part 10. The ring component 2, which serves as eye portion, is in this case led through partially circular openings 15 in the side walls of the second fastening part 10.

Forces acting on the ring component 2 are supported on the one hand via the two first fastening hooks 6 and the second fastening hook 7 of the first fastening part 3, and via the third fastening hook 11, arranged between the second fastening hook 7 and the holding plate 1, of the second fastening part 10. In this case, the component of the forces that are supported on the holding plate 1 by the two first fastening hooks 6 is greater than the component of the forces that are supported on the third fastening hook 11 by the second fastening hook 7 and on the holding plate 1 by said third fastening hook, because that portion of the ring component 2 which is guided in the tunnel-shaped portion 5 and via which the forces are transmitted to the first fastening part 3 is situated closer to the two first fastening hooks 6 than to the second fastening hook 7. In this way, it is made possible for the third fastening hook 11, and in particular the second fastening part 10 as a whole, to be formed from plastic.

Since the forces transmitted to the third fastening hook 11 by the second fastening hook 7 do not give rise to a relevant moment with regard to a pivoting movement which is opposed to the pivoting during the mounting of the second fastening part 10, a load on the ring component is substantially not transmitted to the latching connection. The latching connection therefore does not need to be designed for supporting correspondingly large forces.

The embodiment of a combination as claimed in the invention illustrated in FIGS. 7 to 11 differs from the embodiment illustrated in FIGS. 1 to 6 merely in the fact that the first fastening part 3 and the second fastening part 10 are movably connected to one another, and in the provision of a different shape of the second opening 9 of the holding plate 1.

In the planar portion 4 of the main body and in the first portion of the second fastening hook 7 of the first fastening part 3, there is provided a slot-shaped opening 16 which extends in the longitudinal direction and in which a prong 17 of the second fastening part 10 is movably guided. The prong 17 is formed with a portion which runs with an approximately 90° curvature, and said prong has, at the free prong end, two projections 18 which serve as stops. Said projections 18 prevent a release of the prong 17 from the opening 16, and thus a release of the second fastening part 10 from the first fastening part 3. At the same time, the curved profile of the prong 17 permits the pivoting movement required for the mounting of the second fastening part 10.

Figure 11:
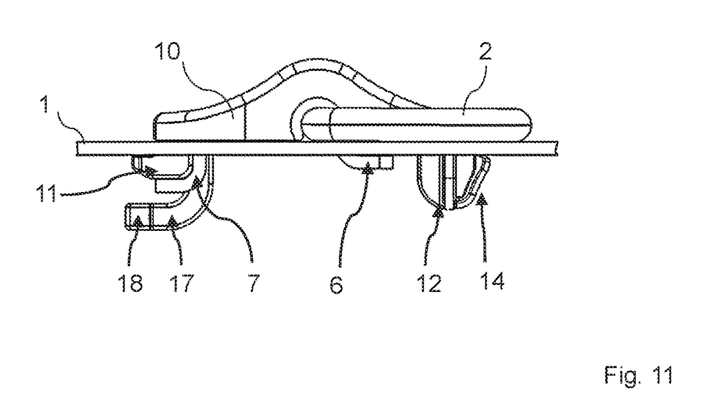
FIG. 11 shows a view from the side of the combination as per FIGS. 7 to 10 with the securing eye mounted.

The second opening 9 in the holding plate 1 in the embodiment of the combination as claimed in the invention as per FIGS. 7 to 11 differs from the second opening 9 in the holding plate 1 in the embodiment as per FIGS. 1 to 6 by an additional opening region 19 (cf. FIG. 7) in which, when the second fastening part 10 is in the end position thereof, a portion of the prong 17 is arranged (cf. FIG. 11).

For the connection of the first fastening part 3 to the second fastening part 10 by means of the prong 17, provision may be made for the prong end of the prong 17 to be inserted into the opening 16 with the second fastening part 10 in an orientation rotated through 90°, in which the two mutually opposite projections 18 of the prong 17 are oriented parallel to the longitudinal direction of the slot-shaped opening 16 in the first fastening part 3. By means of a subsequent rotation of the second fastening part 10 through 90° into the orientation relative to the first fastening part 3 as illustrated in FIGS. 7 to 11, it is then achieved that the projections 18 engage behind the slot-shaped opening 16 in the first fastening part 3 and thus secure the connection between the first fastening part 3 and the second fastening part 10. Such a rotation of the second fastening part 10 relative to the first fastening part 3 may, owing to the approximately rectangular cross section of the prong 17, be associated with an elastic deformation of the prong 17, and thus with a defined expenditure of force. This can prevent an undesired release of the connection.

The invention claimed is:

1. A combination of a securing eye and a holding plate, wherein the securing eye has a fastening portion and an eye portion, wherein the fastening portion comprises a first fastening part, which incorporates the eye portion, and a second fastening part, wherein the first fastening part has a fastening element which can be brought into a positive connecting effect with the holding plate by means of a rotational and/or translational mounting movement of the first fastening part, and wherein the second fastening part can be placed on the holding plate and prevents the positive connecting effect between the first fastening part and the holding plate from being released,
    wherein the holding plate has at least two openings which each extend through a first side to an opposing second side of the holding plate for receiving the fastening element, and
    wherein the eye portion comprises a ring component which is arranged in a rotationally movable manner in a receptacle of the first fastening part and/or between the first fastening part and the holding plate, the receptacle being different from the at least two openings.

2. The combination as claimed in claim 1, wherein the fastening element comprises at least one fastening hook which, in order to form the positive connecting effect, engages behind at least one of the at least two openings.

3. The combination as claimed in claim 1, wherein the second fastening part has at least one fastening hook which, with the second fastening part in a fastened state, engages behind at least one of the at least two openings.

4. The combination as claimed in claim 3, wherein the second fastening part has at least one latching element in order to form a latching connection with the holding plate.

5. The combination as claimed in claim 4, wherein the fastening element of the first fastening part and/or a portion, incorporating the eye portion, of the first fastening part is arranged between the fastening hook and the latching element of the second fastening part in a fastened state thereof.

6. The combination as claimed in claim 3, wherein the first fastening part supports a load, acting on the eye portion, on the fastening hook of the second fastening part.

7. The combination as claimed in claim 6, wherein the first fastening part forms at least a second fastening hook which engages behind the fastening hook of the second fastening part.

8. The combination as claimed in claim 1, wherein the combination further comprises an elastically deformable component that elastically deforms when the ring component component interfaces therewith, which elastically deformable component establishes a positive but rotatable hold on the ring.

9. The combination as claimed in claim 3, wherein the at least two openings are for receiving a fastening hook of the first fastening part and/or the fastening hook of the second fastening part.

10. The combination as claimed in claim 1, wherein the first fastening part and the second fastening part are connected to one another in a moveable manner.

11. The combination as claimed in claim 10, wherein the second fastening part has a prong which is guided in an opening of the first fastening part, wherein the prong forms a projection serving as a stop.

12. A combination of a securing eye and a holding plate, wherein the securing eye comprises:
a fastening assembly, wherein the fastening assembly includes a first fastening part and an eye portion; and
a second fastening part that is at least partially over the first fastening part, relative to the holding plate, wherein
the first fastening part has a plurality of fastening elements which can be brought into a positive connection with the holding plate via a rotational and/or translational mounting movement of the first fastening part relative to the holding plate, and wherein the second fastening part is configured to be placed on the holding plate and prevents the positive connection between the first fastening part and the holding plate from being released, and
the holding plate has at least two openings which each extend through a first side to an opposing second side of the holding plate for receiving respective fastening elements of the plurality of fastening elements,
wherein the eye portion comprises a ring component which is arranged in a rotationally movable manner in a receptacle of the first fastening part and/or between the first fastening part and the holding plate, wherein the receptacle is different from the at least two openings.

13. A combination of a securing eye and a holding plate, wherein the securing eye has a fastening portion and an eye portion, wherein the fastening portion comprises a first fastening part, which incorporates the eye portion, and a second fastening part, wherein the first fastening part has a fastening element which can be brought into a positive connecting effect with the holding plate by means of a rotational and/or translational mounting movement of the first fastening part, and wherein the second fastening part can be fastened to the holding plate and prevents the positive connecting effect between the first fastening part and the holding plate from being released, wherein a ring component of the eye portion is held in a receptacle of the first fastening part by a component which is temporarily elastically deformed by the ring component.

14. The combination as claimed in claim 1, wherein the first fastening part and/or the eye portion are formed from metal and the second fastening part is formed from plastic.

15. The combination as claimed in claim 1, wherein the at least two openings are for receiving a fastening hook of the first fastening part and/or a fastening hook of the second fastening part.

16. The combination as claimed in claim 1, wherein the first fastening part and the second fastening part are separate components.

17. The combination as claimed in claim 13, wherein the ring component is arranged in a rotationally movable manner in a receptacle of the first fastening part and/or between the first fastening part and the holding plate, the receptacle being different than other openings.

18. The combination of claim 12, wherein the second fastening part has at least one fastening hook which, with the second fastening part in a fastened state, engages behind at least one of the at least two openings.

19. The combination of claim 12, wherein the combination further comprises an elastically deformable component that elastically deforms when the ring component interfaces therewith.

20. The combination of claim 13, wherein the ring component is arranged in a rotationally movable manner in the receptacle of the first fastening part and/or between the first fastening part and the holding plate.

* * * * *